April 17, 1962 F. L. WAITE 3,030,244

WRAPPING MACHINE BAND SEALER

Filed July 29, 1958 2 Sheets-Sheet 1

INVENTOR.
FRED L. WAITE
BY Wentworth E. Clapham
ATTORNEY

April 17, 1962 F. L. WAITE 3,030,244

WRAPPING MACHINE BAND SEALER

Filed July 29, 1958 2 Sheets-Sheet 2

INVENTOR.
FRED L. WAITE
BY Wentworth B. Clapham
ATTORNEY 3,030,244
WRAPPING MACHINE BAND SEALER Fred L. Waite, East Williston, N.Y., assignor to American Machine & Foundry Company, a corporation of New Jersey Filed July 29, 1958, Ser. No. 751,668
4 Claims. (Cl. 156—499)

The present invention relates to wrapping machines and more particularly to a novel strip label or supplemental wrapper applying attachment for such machines.

In the manufacture and distribution of bread and other bakery goods for example, each loaf of bread is generally wrapped in transparent wrapping material; such as, cellophane. Such materials are easily folded and sealed and, being transparent, readily permit an inspection of the contents of a package by a purchaser before purchasing it.

In the case of wrapped loaves of sliced bread, it has been found desirable to reinforce the cellophane or other selected transparent wrapper with a band or strip of waxed paper of the like. Also, in order to minimize printing costs and since usually each package carries the trade or brand name of the goods therein, the reinforcing band is provided with desired printed indicia to carry the identification of the product and other relevant information; such as, price and the like.

In prior types of strip applying devices heat was applied to the band or strip as it was drawn across a heating element or plate in order to activate the thermoplastic coating material thereon. However, having the band in direct contact with the heating element caused greatly increased frictional drag on the feed mechanism of the machine. This was especially troublesome in heating the thermoplastic wrapping materials presently utilized, wherein the coatings in proceeding from a solid or normal state to their liquid or adhering state pass through a highly frictional viscous condition.

Further, in presently-known band or strip applying devices, the heating element was in contact with the side or surface of the band which would be most remote when the strip or band, either plain or printed, was finally affixed to the wrapper web. Thus, to heat the surface of the label-bearing band which is to be in direct contact with the wrapper web to the proper adhering temperature, required that the entire cross-section of the label band be heated to a high degree. This presented a problem since the activated or energized theremoplastic coating on the side of the label remote from the wrapper web would tend to adhere to the web feed rollers of the wrapping machine.

In the present invention, the label-bearing band is passed beneath but spaced from a thermostatically-controlled heating element. The thermoplastic coating thereon is thus activated or energized by radiant heat rather than contact conduction, thereby requiring less heat and power and providing more rapid energization of the coating. Likewise, the heating element is so positioned with respect to the label or strip feed that only the surface of the label or strip to be adhered to the wrapper web is heated, energizing the coating on this face only. This eliminates the thermoplastic material coating on the wrapping material web from adhering to the band feed rollers and supporting surfaces which results in shutdowns and delays for cleaning and replacement.

It is, therefore, an object of this invention to provide a strip or band applying device wherein the thermoplastic coating on a continuous web of strip or banding material is energized by means of radiant heat so that the strip or banding material may be affixed to a continuous wrapper web in a novel manner.

It is an additional object of the invention to provide a label or strip band applying device wherein a label-bearing strip of band is passed beneath and in spaced relation to a thermostatically-controlled heating element which energizes the coating on the surface of the band which is affixed to a continuous upper web.

A further object of the invention is to provide a label applying device wherein only the surface of the label which is applied directly to a wrapping web is heated to energize its thermoplastic coating and thereby render it adhesive so that it will adhere to the wrapping web.

Another object of this invention is to provide a label applying device wherein the thermoplastic coating on the entire surface of the label is energized and adhered to a wrapping web.

It is an additional object to provide an adjustable label applying device operative to locate the label-bearing band or reinforcing strip in any predetermined position on a web of wrapping material to form thereby a composite indicia bearing and/or reinforced wrapping material web.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
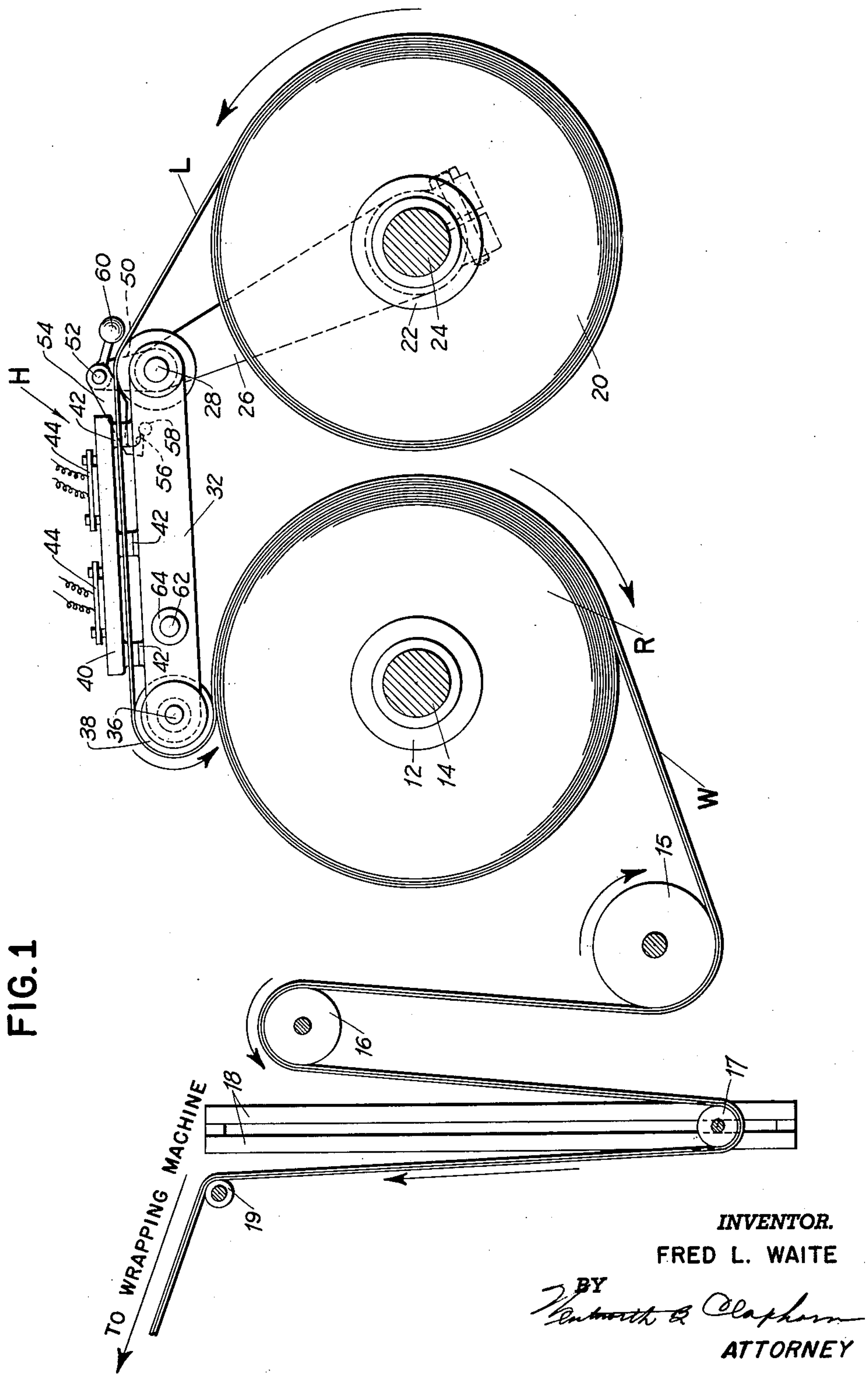
FIGURE 1 is a side elevation of a preferred form of the invention, shown in operative relationship with the web feeding system of a conventional wrapping machine.
Figure 2:
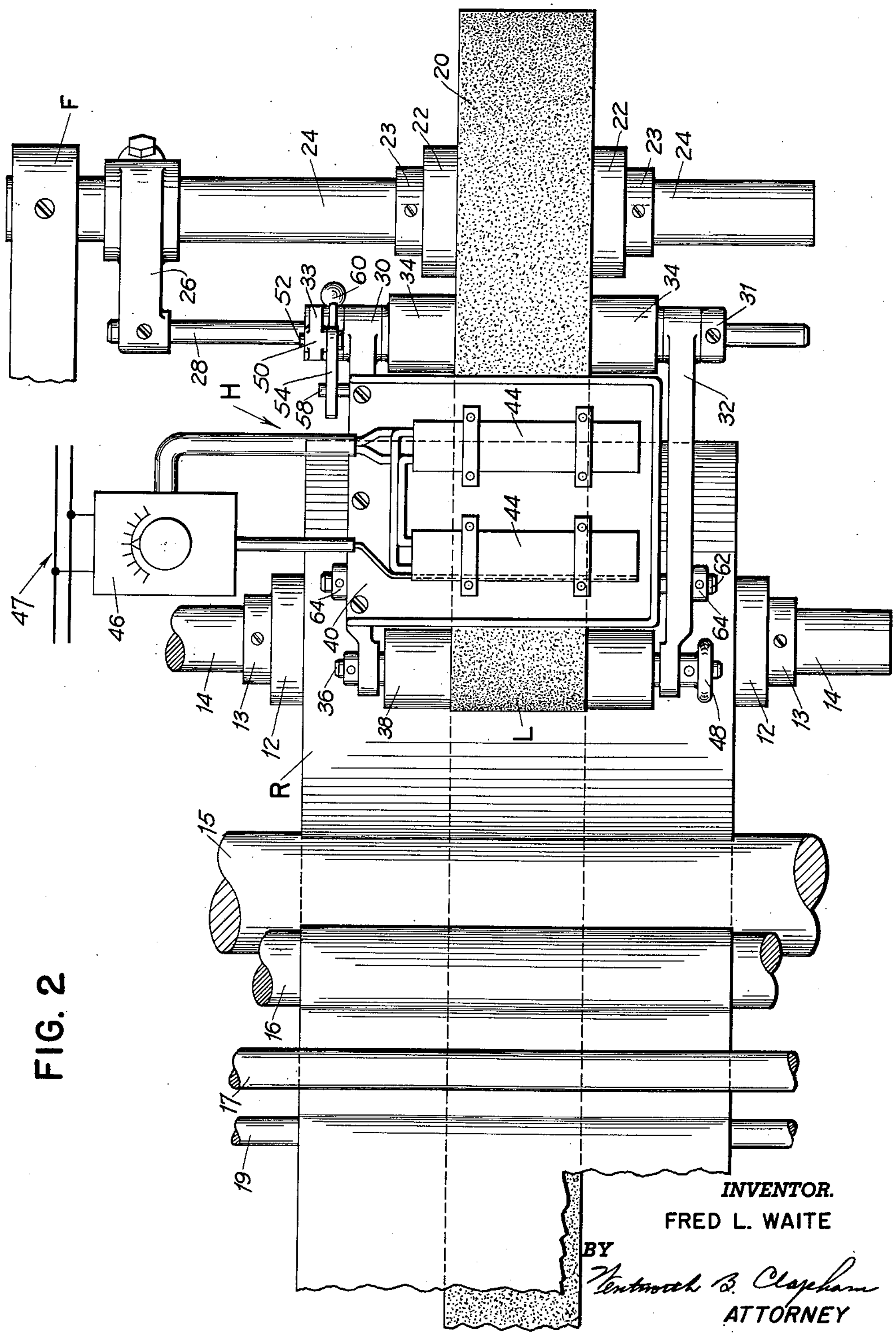
FIGURE 2 is a plan view of the mechanism illustrated in FIGURE 1.

In the embodiment selected to illustrate the invention, there is illustrated in FIGURES 1 and 2, a portion of a conventional wrapping machine; namely, the wrapping web feeding system. The system comprises a roll R of suitable wrapping material or web W, such as, cellophane, waxed paper, or the like. Roll R is supported on end supports 12, rotatably mounted on a cantilevered shaft 14. Supports 12 are held in place on shaft 14 by adjustable collars 13 while shaft 14 is secured in a frame member (not shown) of the machine.

Web guide rollers 15 and 16 are also mounted in the frame members (not shown) adjacent shaft 14. Web W is threaded around guide rollers 15 and 16 and thence downwardly around a slack roller 17 mounted for vertical movement only in guides 18 secured to the frame members (not shown). From roller 17, web W passes upwardly over another guide roller 19 and thence onward to the wrapper-applying and folding mechanism of the conventional bread wrapping machine.

The wrapping method and mechanism may vary widely but, in general, may be similar to that disclosed in Arelt Patent 2,356,644. Also, the web feeding mechanism may be similar to that disclosed in my co-pending application S.N. 611,107, filed September 21, 1956, now Patent 2,945,337 for Wrapping Material Web Feeding Mechanism. Therefore, only so much disclosure thereof as is necessary for a complete understanding of the present invention is included herein.

Mounted adjacent and preferably rearwardly of roll R is a second roll 20 of band or reinforcing strip material L supported on end supports 22 rotatably mounted on a second cantilevered shaft 24. Supports 22 are held in place on shaft 24 by adjustable collars 23 while shaft 24 is secured in the framework F, as shown in FIGURE 2. Material L may, if desired, have printed indicia thereon thereby serving as a label for the articles wrapped. Strip or band material L preferably is provided with a suitable thermoplastic coating; such as, wax. Adjustably mounted on shaft 24 adjacent framework F and extending upwardly therefrom is a bracket 26. Fixed in the free end of bracket 26 and extending transversely thereof substantially parallel to shafts 14 and 24 is a shaft 28 on which is supported strip band heating device designated generally H.

Heating device H comprises link arms 30 and 32, one end of each of which is pivotally supported on shaft 28 (FIGURE 2) and fixed in position thereon by collar 31 and bracket 33. A guide roller 34 is rotatably mounted on shaft 28 between link arms 30 and 32 while the free ends of link arms 30 and 32 support another shaft 36. Mounted on shaft 36 between the free ends of link arms 30 and 32 is a pressure roller 38 which normally occupies an operative position adjacent the circumference of web supply roll R, as shown best in FIGURE 1.

Web L is threaded around guide roller 34 and is fed beneath and spaced from heater plate 40 secured to brackets 42 fixed to link arm 30. See FIGURE 1. Plate 40 spans substantially the entire width between arms 30 and 32 and is provided with suitable conventional electrical heating elements 44. The amount of heat emitted by elements 44 is controlled by a thermostat control 46 of conventional construction which may be manually set by the operator to the desired temperature, depending on the composition of the coating of the web L. A main supply circuit designated generally 47 is electrically connected to heating elements 44 through thermostatic control 46 as shown in FIGURE 2. Cross-member 62 is secured transversely in link arms 30 and 32 by collars 64, providing structural rigidity to the strip-heating device H.

The heated strip or band material, L, then passes around pressure roller 38 which serves to press the heat energized or activated surface of label or strip material L into bonding engagement with the web W of wrapping material, as is illustrated in FIGURES 1 and 2.

Since it may become necessary to move heating device H out of operative position for purposes of maintenance or the renewing of supply rolls R and 20, there is provided a handle 48 on one end of shaft 36 as shown in FIGURE 2. Handle 48 is actuated by the machine operator to pivot link arms 30 and 32 about their connections to shaft 28 moving heating device H out of operative position adjacent supply roll R. To maintain heating device H in non-operative position, bracket 33 fixed to shaft 28 is provided with an upwardly extending portion 50 having a transverse stud 52 at the free end thereof. Pivotally supported on stud 52 is a latch member 54 provided with a locking recess 56 adapted to engage pin 58 secured to link arm 30. Operating arm 60 is secured to latch member 54.

The machine operator moves arm 60 to pivot latch member 54 toward pin 58 such that pin 58 is engaged in recess 56 thereby maintaining heating device H in non-operative position until released by the operator.

In the event that the diameter of supply roll S, through use, has decreased to the point that latch member 54 has moved by the force of gravity into the path of travel of pin 58 as heating device H is moved out of operative position, the operator merely actuates arm 60 to move latch member 54 out of the path of travel of pin 58 until heating device H is in non-operative position at which time, latch member 54 is again actuated to maintain device H in non-operative position until released.

In operation, device H is moved to its non-operative position, as described hereinabove. The web of band or strip material L having a heat energizable adhesive coating is threaded around guide roller 34, thence beneath heater plate 40 and around guide roller 38. The free end of material L is secured to the outer layer of web material W and device H pivoted to operative position adjacent supply roll R. Thermostatic control 46 is actuated whereupon current is supplied to the heating elements 44 of plate 40. As soon as plate 40 has reached the selected temperature required to reactivate the coating on the web of material L, the wrapping web feeding mechanism of the associated machine may be started, whereupon the web of material L is drawn thereby off the supply roll

20, passing beneath heater plate 40 and into direct engagement with the web W of wrapping material immediately in advance of the pressure roller 38.

As the heat activated coating on the surface of band material L is brought into direct engagement with the outer layer of roll R, roller 38 firmly presses the entire surface of the band material L into bonding engagement with the surface of web W. The composite web then passes around rollers 15 and 16 and downwardly under slack roller 17 and upwardly over guide roller 19 and thence to the wrapping and folding mechanism of a conventional wrapping machine.

It will be readily understood that loosening collar 31 and bracket 33 and set screws 66 of collars 23 heating device H and band supply roll 20 can be moved laterally on shafts 28 and 24 respectively to locate the band or strip in any desired position on wrapping web W. Likewise by providing adjustable set screws 67 for collars 13, roll R may be replaced when necessary or the position of the web W of wrapping material relative to the heating device H or label supply roll 20 may be altered, if desired. Further, link arms 30 and 32 and rollers 34 and 38 are preferably of sufficient width to handle material in any of the generally desired widths; that is, any width up to nine inches.

I claim:

1. In apparatus for supplying to a wrapping machine a web of wrapping material bonded to a strip of thermoplastic-coated material, a device for applying a strip of thermoplastic-coated material directly to a web of wrapping material comprising a support, a pair of laterally spaced arms, means pivotally connecting one end of each of said arms to said support, a guide roller roatably supported in said arms adjacent said support, a pressure roller rotatably supported in the free ends of said arms, said arms being adapted for swinging movement to move said pressure roller into and out of operative position adjacent the periphery of the wrapping material supply roll, said pressure roller being adapted to be driven in operative position by peripheral engagement with said wrapping material supply roll, a heating plate supported on and above one of said arms and extending above the other of said arms, heating elements for heating substantially the entire surface of said plate, a thermostatic control to selectively control the temperature of said plate, said strip of thermoplastic-coated material being adapted to travel over said roller and beneath and spaced from heating plate to energize the coating on the face of the strip which is banded to said wrapping material web thereof by radiant heat whereby said entire surface of said strip is pressed into bonding engagement with said web of wrapping material by said pressure roller when in operative position.

2. Apparatus for supplying to a bread wrapping machine a web of wrapping material having a band of label material bonded thereto, comprising a rotatable guide roller, a supply roll of said band of label material, said band having a thermoplastic coating on one side thereof, said supply roll being so mounted that said band passes over said guide roller as it is withdrawn from said supply roll, a supply roll of said web of wrapping material, support arm means mounted for pivotal movement about the axis of rotation of said guide roller, a pressure roller mounted on said support arm means for pivotal movement therewith, said pressure roller being rotatable relative to said support arm means about an axis parallel to the axis of rotation of said guide roller, said band passing over said pressure roller after passing over said guide roller and being pressed by said pressure roller against said supply roll as said web is withdrawn therefrom, a heat radiating element mounted on said support arm means and extending completely across and parallel to and spaced from the plane of the path of travel of said band as it passes between said rollers, and means for heating said element so that said coating is heated by radiant heat energy from said element.

3. Apparatus for supplying to a bread wrapping machine a web of wrapping material having a band of label material bonded thereto, comprising: a guide roller; a pressure roller parallel to said guide roller; a pair of parallel arms rotatably supporting said pressure roller, said arms being mounted for pivotal movement about the axis of rotation of said guide roller; a flat plate mounted on at least one of said arms for pivotal movement therewith; means for heating said plate; a supply roll of said band of label material having a thermoplastic coating on one side thereof, said supply roll being mounted so that as said band is withdrawn, said band passes over said guide roller and over said pressure roller in a manner so that said coating is located on the side of said band away from said rollers and travels along a path parallel to said plate whereby said coating is heated directly by radiant heat from said plate; and a supply roll of said web of wrapping material mounted so that said pressure roller presses said band against said supply roll as said web is withdrawn therefrom so that said coating bonds said band to said web.

4. Apparatus for supplying to a wrapping machine a web of wrapping material having a band, provided with a thermoplastic coating, bonded thereto, comprising a supply roll of said web, a supply roll of said band, apparatus for applying said band to said web comprising a support for said supply roll of said band, a bracket mounted at one end on said support adjacent said supply roll, a frame having laterally spaced side members, means pivotally connecting one end of said frame to the free end of said bracket, supporting means for said band including a guide roller freely supported in said frame adjacent said bracket, a pressure roller spaced longitudinally from said guide roller, said pressure roller being freely rotatably supported in the free end of said frame and adapted to be driven by peripheral engagement with said roll of wrapping material when said pressure roller is in normal operative position thereagainst, a heating plate supported on and above one of said side members of said frame and extending thereacross above said band being supported by said guide roller and said pressure roller, heating elements for heating said plate, said band being adapted to travel from said supply roll thereof over said guide roller and beneath and spaced from said heater plate to activate said coating on the surface which is to be applied directly to said web, said coating being heated by radiant energy whereby said band is bonded to the surface of said web when pressed thereagainst by said pressure roller.

References Cited in the file of this patent

UNITED STATES PATENTS

| | | |
|---|---|---|
| 2,156,241 | Jensen | Apr. 25, 1939 |
| 2,495,053 | Conaway et al. | Jan. 17, 1950 |
| 2,584,002 | Elser | Jan. 29, 1952 |
| 2,814,328 | Jess | Nov. 26, 1957 |